(12) United States Patent
Radenbaugh et al.

(10) Patent No.: US 9,975,616 B2
(45) Date of Patent: May 22, 2018

(54) DEVICE FOR HOLDING A MOTOR AND A PROPELLER, AND RELATED DEVICES SYSTEMS AND METHODS

(71) Applicants: Michael Jay Radenbaugh, Seattle, WA (US); Marimar Sophia White-Espin, Seattle, WA (US)

(72) Inventors: Michael Jay Radenbaugh, Seattle, WA (US); Marimar Sophia White-Espin, Seattle, WA (US)

( * ) Notice: Subject to any disclaimer, the term of this patent is extended or adjusted under 35 U.S.C. 154(b) by 77 days.

(21) Appl. No.: 14/720,124

(22) Filed: May 22, 2015

(65) Prior Publication Data

US 2015/0336649 A1 Nov. 26, 2015

Related U.S. Application Data

(60) Provisional application No. 62/002,075, filed on May 22, 2014.

(51) Int. Cl.
| | |
|---|---|
| *B63H 21/17* | (2006.01) |
| *B63H 5/14* | (2006.01) |
| *B63H 23/24* | (2006.01) |
| *B63B 35/71* | (2006.01) |
| *B63H 25/42* | (2006.01) |
| *B63B 35/79* | (2006.01) |
| *B63H 21/30* | (2006.01) |

(52) U.S. Cl.
CPC ............... *B63H 5/14* (2013.01); *B63B 35/71* (2013.01); *B63H 21/17* (2013.01); *B63H 23/24* (2013.01); *B63H 25/42* (2013.01); *B63B 35/7926* (2013.01); *B63B 35/7943* (2013.01); *B63B 2035/715* (2013.01); *B63H 2021/171* (2013.01); *B63H 2021/307* (2013.01); *Y02T 70/5245* (2013.01)

(58) Field of Classification Search
CPC ........ B63H 21/17; B63H 23/24; B63B 35/71; B63B 2035/715; B63B 35/7943
See application file for complete search history.

(56) References Cited

U.S. PATENT DOCUMENTS

| | | | |
|---|---|---|---|
| 9,260,173 B2 * | 2/2016 | Case | ...................... B63H 23/04 |
| 2003/0167991 A1 * | 9/2003 | Namanny | ........... B63B 35/7926 |
| | | | 114/55.56 |

* cited by examiner

*Primary Examiner* — Andrew Polay
(74) *Attorney, Agent, or Firm* — Janeway Patent Law PLLC

(57) ABSTRACT

A device for holding a motor and a propeller includes a body operable to hold a motor that, when coupled to a propeller and a power source, is operable to rotate the propeller. The device also includes a mount operable to releasably fasten the body to a personal-sized watercraft. With the mount, the device (and thus the motor and propeller that the device holds) may be releasably fastened to any personal-sized watercraft, such as a kayak, a surfboard, an inflatable paddleboard, and a non-inflatable paddleboard. The body includes a cavity configured to receive the motor such that, when the motor is disposed in the cavity, the body holds the motor. The body also includes a conduit configured to hold a power cable that, when coupled to the motor and the power source, provides power from a power source to the motor.

8 Claims, 4 Drawing Sheets

DEVICE FOR HOLDING A MOTOR AND A PROPELLER, AND RELATED DEVICES SYSTEMS AND METHODS

CROSS REFERENCE TO RELATED APPLICATION AND CLAIM OF PRIORITY

This application claims priority from commonly owned U.S. Provisional Patent Application 62/002,075 filed 22 May 2014, and titled "Motorized Skeg Adapter, and Related Systems and Methods", incorporated by reference.

BACKGROUND

A personal-sized watercraft, such as a kayak, a paddle board, a surfboard and a canoe, are enjoyed by people of all ages. Generally speaking, a person can paddle such a watercraft for a moderate distance before tiring, the distance varying with weather conditions and physical endurance capabilities. To extend one's range with a personal-sized watercraft, one may mount a motor to the craft. This allows one to reach remote scenic areas that are not accessible by road. In addition to extending one's range, a motor can also help one return safely to shore when the water conditions, weather conditions, or both, change for the worse.

Unfortunately, though, many motors are too big to mount to a personal-sized watercraft. And many smaller motors are specifically designed for a specific personal-sized watercraft that the motor is intended to be used with.

SUMMARY

In an aspect of the invention, a device for holding a motor and a propeller includes a body operable to hold a motor that, when coupled to a propeller and a power source, is operable to rotate the propeller. The device also includes a mount operable to releasably fasten the body to a personal-sized watercraft. The body includes a cavity configured to receive the motor such that, when the motor is disposed in the cavity, the body holds the motor. The body also includes a conduit configured to hold a power cable that, when coupled to the motor and the power source, provides power from a power source to the motor.

With the mount, the device (and thus the motor and propeller that the device holds) may be releasably fastened to any personal-sized watercraft, such as a kayak, a surfboard, an inflatable paddleboard, and a non-inflatable paddleboard. This allows one to paddle one's personal-sized watercraft during the beginning of an adventure, and then when one tires or experiences adverse changes in the water and/or weather, quickly return to shore. Or, one can simply go for a leisurely cruise without paddling at all. With the cable that provides power to the motor held inside a conduit of the device's body, the cable is protected from damage as the personal-sized watercraft moves through water, and drag generated by the cable as the personal-sized watercraft moves through water is reduced. And, with the motor disposed in the cavity of the body and the cavity submerged in the water, the water may cool the motor and help keep the motor from overheating during prolonged use.

In another aspect of the invention, an adapter for mounting to a kayak a device for holding a motor and a propeller includes a first component configured to fasten the adapter to a kayak; and a second component configured to receive a device for holding a motor and a propeller, and to releasably hold the device.

With the adapter, one can easily and releasably mount a device that holds a motor and propeller to any personal-sized watercraft, such as a kayak. This allows one to paddle the kayak during the beginning of an adventure, and then when one tires or experiences adverse changes in the water and/or weather, quickly return to shore.

DETAILED DESCRIPTION

Figure 1:
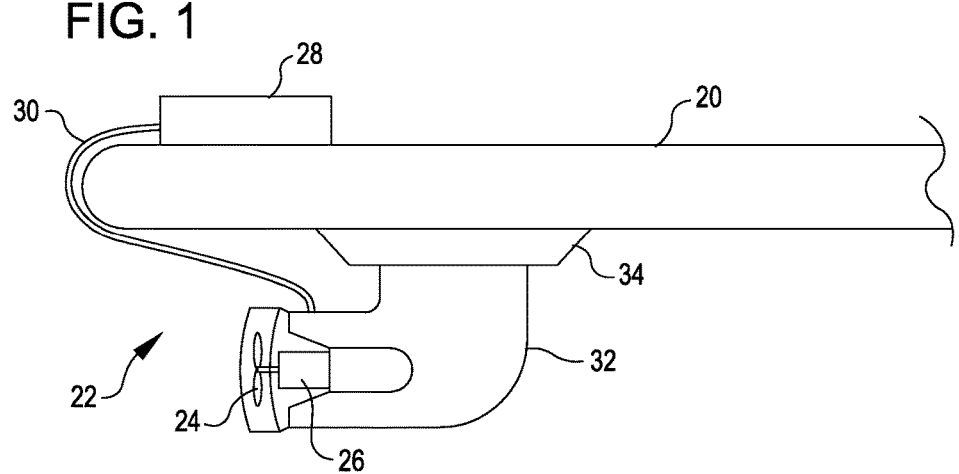
FIG. 1 shows a view of a personal-sized watercraft with a system for propelling the watercraft, according to an embodiment of the invention.

FIG. 1 shows a view of a personal-sized watercraft 20 and a system 22 for propelling the watercraft 20, according to an embodiment of the invention. The personal-sized watercraft shown here is an inflatable paddleboard; however, the system 22 may be used to propel any other personal-sized watercraft, such as any non-inflatable paddleboard, any surfboard, any kayak, any canoe, and any small boat. The system 22 includes a propeller 24 coupled to a motor 26 that may rotate the propeller 24 to generate thrust, and thus propel the inflatable paddleboard 20 across the surface of a liquid (not shown), such as water in an ocean or lake. The system 22 also includes a power source 28 and a power cable 30 that couples the power source with the motor 26 and conveys power from the power source 28 to the motor 26. The system 22 also includes a device 32 (shown and discussed in greater detail in conjunction with FIGS. 4 and 6) that holds the motor 26 and the propeller 24 while both are under the liquid's surface. The device 32 includes a mount (not shown in FIG. 1, but shown and discussed in greater detail in conjunction with FIGS. 4 and 6) that releasably fastens the device 32 to a receptacle 34 of the inflatable paddleboard 20.

With the mount of the device 32, one may releasably fasten the device 32, and thus the motor 26 and propeller 24, to the inflatable paddleboard 20. This allows one to paddle one's paddleboard during an excursion on a lake or other body of water, and then, when desired, use the motor 26 and propeller 24 to propel the paddleboard 20 across the water. One may want to use the motor 26 and propeller 24 to rest one's arms or to quickly return to shore. Or, one may simply go for a leisurely cruise without paddling at all. In addition, one may releasably attach the device 32 with the motor 26 and propeller 24 to the paddleboard 20 before one places the paddleboard 20 on the water, or one may carry the device 32 with the motor 26 and propeller 24 on the paddleboard 20 and then while on the water fasten the device 32 to the paddleboard 20 for use. With the motor 26 submerged during use, the water may cool the motor 26 and help keep the motor 26 from overheating during prolonged use.

The power source 28 may be any desired source of power capable of causing the motor 26 to rotate the propeller 24 to generate thrust. For example, in this and other embodiments the power source includes a battery that provides the motor 26 a current of electricity. The battery is a re-chargeable lithium-ion battery that provides fifteen volts when fully charged. In other embodiments, the power source includes a battery that has different materials that generate the voltage which may be fifteen volts, less than fifteen volts and/or more than fifteen volts. In still other embodiments, the power source may include a charger, such as a solar panel, to charge the battery and thus provide greater range or more power.

Still referring to FIG. 1, the system 22 may also include a controller (not shown) for controlling how fast the motor 26 rotates the propeller 24, and/or when the motor 26 rotates the propeller 24, and/or in which direction the motor 26 rotates the propeller 24.

Figure 2:
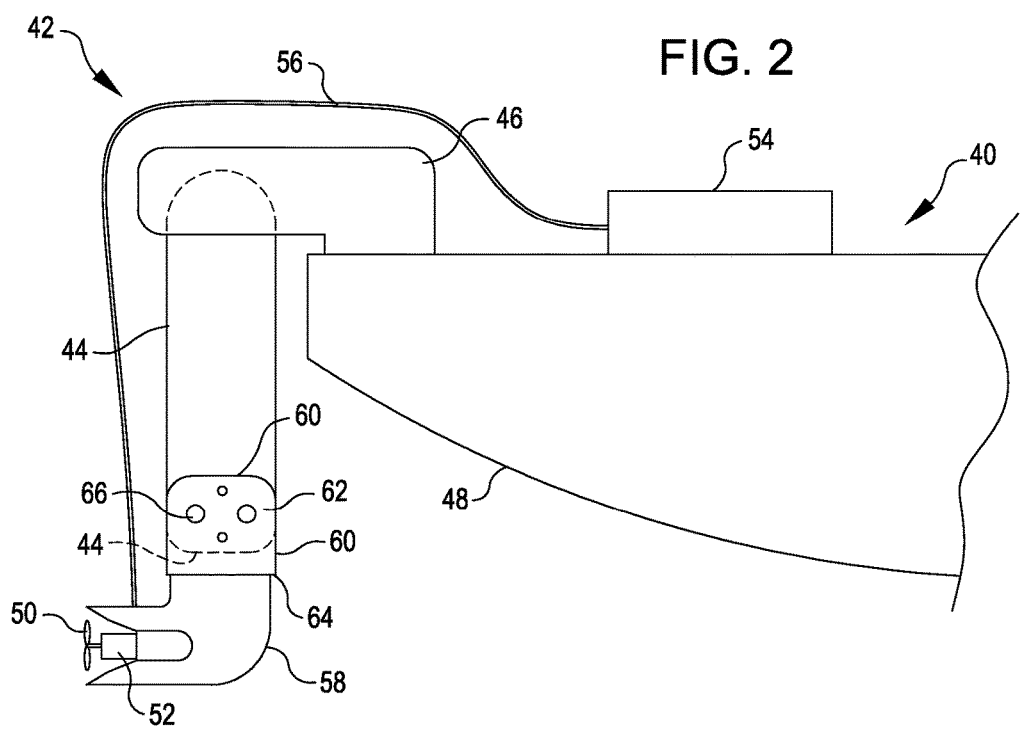
FIG. 2 shows a view of another personal-sized watercraft with a system for propelling the watercraft, according to another embodiment of the invention.

FIG. 2 shows a view of another personal-sized watercraft 40 with a system 42 for propelling the watercraft 40, according to another embodiment of the invention. The personal-sized watercraft 40 shown here is a kayak that includes a rudder 44 to steer the kayak 40 and a rudder mount 46 that couples the rudder 42 to the kayak's body 48. Similar to the system 22 shown in FIG. 1, the system 42 includes a propeller 50 coupled to a motor 52, a power source 54, a power cable 56, and a device 58 (also shown and discussed in greater detail in conjunction with FIGS. 4 and 6) that holds the motor 52 and the propeller 50 and includes a mount (also shown and discussed in greater detail in conjunction with FIGS. 4 and 6). The system 42 also includes an adapter 60 (shown and discussed in greater detail in conjunction with FIGS. 5 and 6) that allows one to releasably fasten the device 58 to the kayak's rudder 44, and thus allow one to use the motor 52 and propeller 50 to propel the kayak. The adapter 60 includes a first component 62 that fastens the adapter 60 to the kayak's rudder 44, and a second component 64 that releasably holds the device 58. As discussed in greater detail in conjunction with FIG. 5, the first component may include a bolt 66 (here four) to fasten the adapter 60 to the kayak's rudder 44.

With the adapter 60, one can easily and releasably mount the device 58, and thus the motor 52 and propeller 50, to the kayak 40. This allows one to paddle the kayak during an excursion on a lake or other body of water, and then, when desired, use the motor 52 and propeller 50 to propel the kayak across the water. One may releasably attach the adapter 60 and/or the device 58 with the motor 52 and propeller 50 to the kayak's rudder 44 before one places the kayak 40 on the water, or one may carry the adapter and/or device 58 with the motor 52 and propeller 50 in the kayak 40 and then while on the water fasten the adapter 60 and/or the device 58 to the kayak 40 for use. This allows one to paddle the kayak during the beginning of an adventure, and then quickly return to shore when one tires or experiences adverse changes in the water and/or weather.

Figure 3:
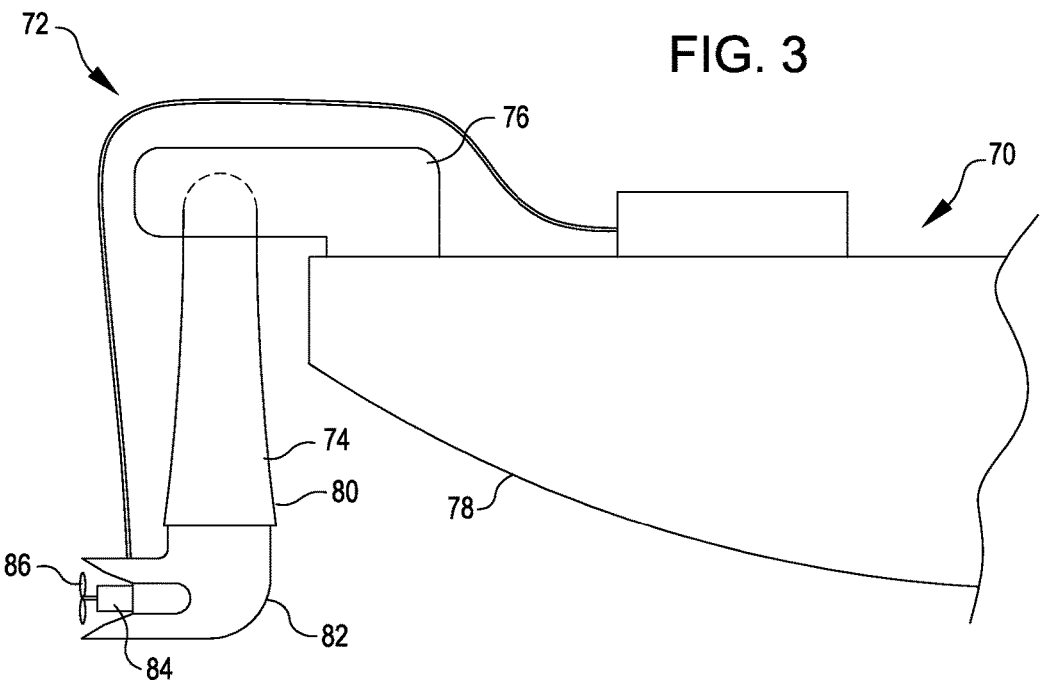
FIG. 3 shows a view of yet another personal-sized watercraft with a system for propelling the watercraft, according to yet another embodiment of the invention.

FIG. 3 shows a view of yet another personal-sized watercraft 70 with a system 72 for propelling the watercraft 70, according to yet another embodiment of the invention. The personal-sized watercraft 70 shown here is also a kayak that includes a rudder 74 to steer the kayak 70 and a rudder mount 76 that couples the rudder 42 to the kayak's body 78.

The system 72 is similar to the system 42 shown in FIG. 2, except that the kayak's rudder 74 includes an adapter 80 that is integral with the rudder 74. This allows one to more easily fasten the device 82, motor 84 and propeller 86 to the kayak 70 because one can simply remove the kayak's conventional rudder (44 in FIG. 2) at the rudder's mount 76, fasten the rudder 74 to the rudder's mount 76, and then releasably fasten the device 82 to the adapter 80 at the end of the rudder 74.

Figure 4:
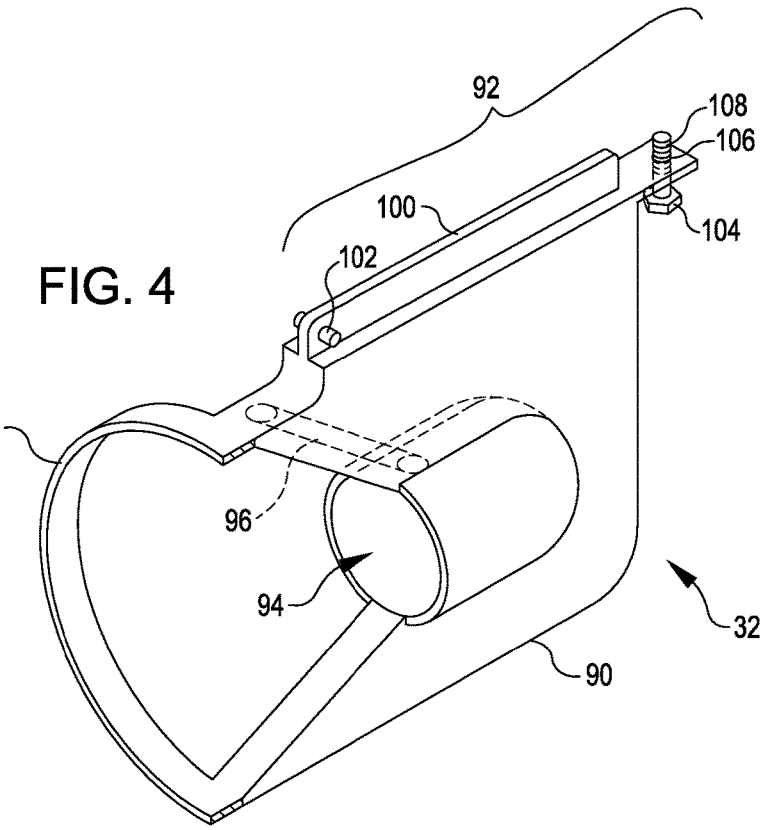
FIG. 4 shows a perspective view of a device of the system shown in FIGS. 1-3, according to an embodiment of the invention.

FIG. 4 shows a perspective view of a portion of the device 32, 58, 82 shown in FIGS. 1-3, respectively, according to an embodiment of the invention. Although the device 32, 58, 82 will be identified as the device 32 in this discussion relating to FIG. 4, this discussion of the device 32 applies to the device 58 shown in FIG. 2 and the device 82 shown in FIG. 3.

The device 32 includes a body 90 to hold the motor 26 (FIG. 1) and a mount 92 to releasably fasten the body 90 to a personal-sized watercraft (FIG. 1) or an adapter (60 in FIG. 2, 80 in FIG. 3) that is then fastened to a personal-sized watercraft. The body 90 includes a cavity 94 that receives the motor (26 in FIG. 1) such that when the motor is disposed in the cavity, the body 90 holds the motor. The body 90 also includes a conduit 96 that holds a section of the power cable (30 in FIG. 1). With the motor 26 held by the body 90, the motor 26 is submerged while the propeller 24 generates thrust in water, and thus, may be kept cool during prolonged use. With the conduit 96 holding the power cable 30, the cable 30 is protected from damage as the device 32 moves through water, and the drag generated by the cable 30 is reduced.

The body 90 may be configured as desired to hold the motor 26 and propeller 24. For example, in this and other embodiments the body 90 is shaped like a fin to help provide the personal-sized watercraft directional control and stability, and includes a propeller-ring 98 (half of the propeller-ring is omitted for clarity) to protect the propeller during use. The propeller-ring 98 is releasably mounted to the fin portion of the body 90 to allow one to either use or not use the propeller-ring 98 as desired. In addition, the body's cavity 94 and conduit 96 each has a cylindrical shape and is configured to snugly hold the respective one of the motor 26 and the power cable 30. More specifically, the cavity 94 is sized to surround a portion of the motor 26 that includes the junction where the power cable 30 contacts the motor 26. In other embodiments, the cavity 94 may be sized to surround the whole motor 26. In such embodiments, the motor 26 may be sealed inside the cavity 94 to prevent water from damaging the motor 26.

The material of the body 90 may also be any desired material capable of holding the motor 26 and propeller 24 while the motor 26 and propeller 24 generate thrust. For example, in this and other embodiments the material includes a plastic to reduce the cost of manufacturing the body 90. In other embodiments the body 90 may include a composite material, such as carbon fiber or kevlar, a metal, such as aluminum, or a combination of any desired materials.

Still referring to FIG. 4, the mount 92 may be configured as desired to releasably fasten the device 32 to a personal-sized watercraft or an adapter 60 (FIGS. 2 and 4). For example in this and other embodiments the mount 92 includes a tongue 100, a pin 102, a bolt 104 and a nut (not shown here but shown in FIG. 6). As discussed in greater detail in conjunction with FIG. 6, to releasably fasten the device 32 to a personal-sized watercraft or an adapter 60, the tongue 100, pin 102 and nut are received and held by a groove or slot in the personal-sized watercraft or adapter 60, and the bolt 104 threadingly engages the nut. More specifically, the tongue 100 is sized and configured to snugly fit into a corresponding groove of a personal-sized watercraft's mount 34 (FIG. 1) or the adapter 60 yet slide inside the groove. Similarly, the pin 102 is sized and configured to snugly fit into a slot within the groove yet slide inside the slot. The bolt 104 includes a shank 106 having an external thread 108 that corresponds to an internal thread in a hole in the nut.

Figure 5:
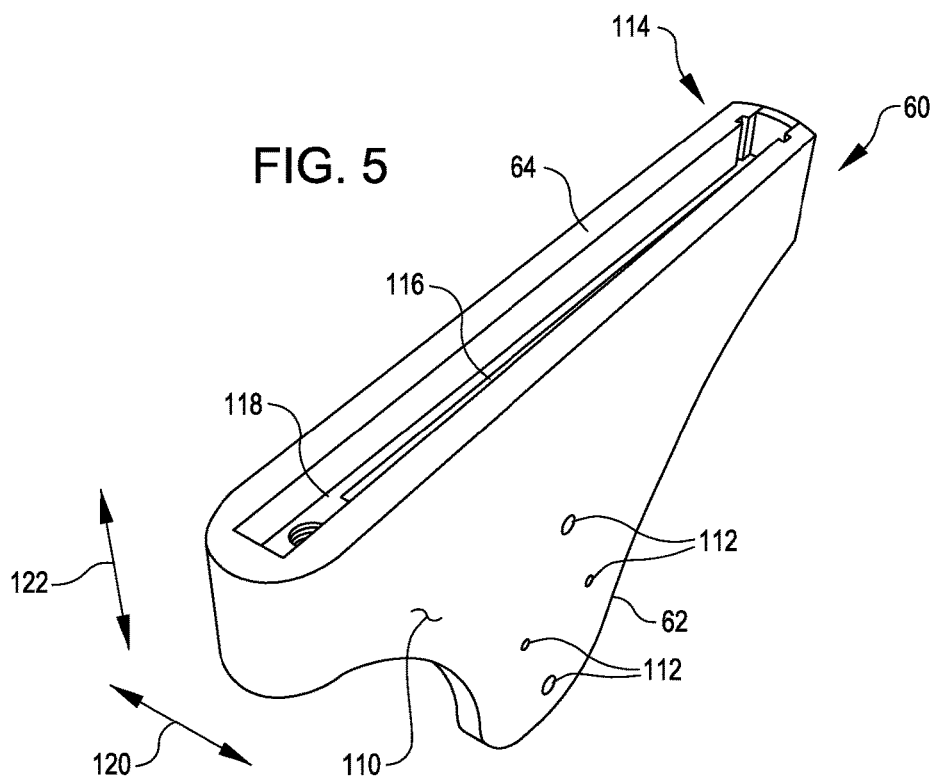
FIG. 5 shows a perspective of an adapter of the system shown in FIG. 2, according to an embodiment of the invention.

FIG. 5 shows a perspective view of the adapter 60 of the system 42 shown in FIG. 2, according to an embodiment of the invention. The adapter 60 allows one to releasably fasten a device 32, 58, 82 to a personal-sized watercraft that does not have a mount to receive and hold the device 32, 58, 82, like the mount 34 (FIG. 2) of the watercraft 20 (FIG. 2), and thus allow one to use the motor 52 and propeller 50 to propel the personal-sized watercraft. In this and other embodiments, the adapter 60 is configured to be fastened to a rudder of a kayak, and includes a first component 62 that fastens the adapter 60 to a kayak's rudder, and a second component 64 that releasably holds the device 32, 58, 82.

The first component 62 may be configured as desired. For example, in this and other embodiments the first component 62 includes a surface 110 that has a contour that corresponds to the surface contour of a section of the rudder, four holes 112, and four conventional fasteners (not shown). To releasably fasten the first component 62 to a rudder, one positions the first component 62 adjacent the rudder such the surface 110 contacts the surface of the rudder, and the contour of the surface 110 matches the contour of the rudder's surface. Then, one aligns each of the holes 112 with a respective hole in the rudder. Then, one inserts one of the conventional fasteners (here a bolt with a corresponding nut) through one of the aligned hole pairs and threads the nut onto the bolt to keep the surface 110 of the adapter 62 from moving relative to the surface of the rudder. In other embodiments, the conventional fasteners may include a strap, a screw, an elastic band, or any combination of these.

Other embodiments are possible. For example, the first component 62 of the adapter 60 may be sized and configured to be a rudder similar to the rudder 74 shown in FIG. 3. In such an embodiment, the first component 62 of the adapter/rudder is fastened to a kayak like a conventional rudder would be.

The second component 64 may be configured as desired to releasably hold a device 32, 58, 82. For example, in this and other embodiments the second component 64 includes a groove 114, a slot 116, and a nut 118. The position of the nut 118 in the groove 114 is fixed, i.e. the nut 114 does not slide inside, along the groove 114. In other embodiments, the nut 118 may slide inside, along the groove to allow one to position the device 32, 58, 82 at different locations relative to the second component 64, similar to the configuration shown in FIG. 6.

The groove 114 is sized and configured to receive a tongue 100 (FIG. 4) of a device 32, 58, 82. The slot 116 is sized and configured to receive a pin 102 (FIG. 4) of a device 32, 58, 82. And, the nut 118 is sized and configured to threadingly receive the shank 106 of the bolt 104 (FIG. 4) of a device 32, 58, 82. When the tongue 100 is positioned in the groove 114, the groove 114 restrains the lateral movement (directions of the arrow labeled 120) of the tongue 100. When the pin 102 is positioned in the slot 116, the slot 116 restrains the longitudinal movement (directions of the arrow labeled 122) of the tongue 100. And, when the threads 108 (FIG. 4) of the bolt's shank 106 engage the nut 118, the nut 118 restrains the pivotal movement of the tongue 100 about the pin 102. In this manner, the tongue 100, and thus the device 32, 58, 82 may be releasably fastened to the adapter 60.

The material of the adapter 60 may also be any desired material capable of supporting the loads exerted on it while the motor 52 and propeller 50 generate thrust. For example, in this and other embodiments the material includes a plastic to reduce the cost of manufacturing the adapter 60. In other embodiments the adapter 60 may include a composite material, such as carbon fiber or kevlar, a metal, such as aluminum, or a combination of any desired materials.

Figure 6:
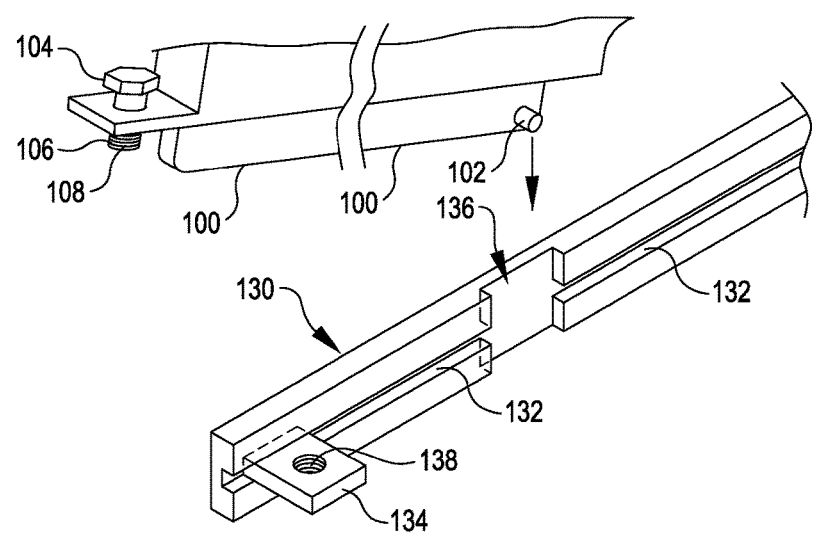
FIG. 6 shows a perspective view of a portion of the system shown in FIG. 1, according to an embodiment of the invention.

FIG. 6 shows a perspective view of a portion of the system 22 shown in FIG. 1, according to an embodiment of the invention. A portion of the device 32 (FIG. 1) that includes a tongue 100, pin 102 and bolt 104, and a portion of the receptacle 34 (FIG. 1) that includes a groove 130, slot 132 and nut 134 are shown as partial views to help illustrate a method for releasably fastening the device 32 to the receptacle 34. The groove 130, slot 132 and nut 134 are similar to the groove 114, slot 116 and nut 118 (FIG. 5) except that the nut 134 may slide along the length of groove 130 to allow one to position the device 32 at different locations along the length of the groove 130.

In this and other embodiments, the tongue 100 is inserted into the groove 130 and releasably held in the groove 130 as follows. First, one inserts the end of the tongue 100 where the pin 102 is located into the middle of the groove 130 so that the pin 102 travels into the entrance slot 136. Then, when the pin 102 is positioned adjacent the slot 132, one inserts the pin 102 into the slot 132. Then, one moves the pin 102 in the slot 132 until the tongue 100 lies in and is parallel to the groove 130. Then, one moves the tongue 100 along the groove 130 to align the shank 106 of the bolt 104 with the hole 138. Then, one rotates the bolt 104 to cause the external thread 108 of the bolt to engage an internal thread (not shown) in the hole 138. Then, before one rotates the bolt 104 enough to generate tension in the shank 106, one moves the tongue 100 along the groove 130 to position the device 32 at a desired location. Then, one rotates the bolt 104 to generate tension in the shank 106. With tension in the shank 106, the nut 134 is forced against the upper wall (not labeled) of the slot 132 to generate friction that restrains the nut from moving along the length of the groove 100.

Figure 7:
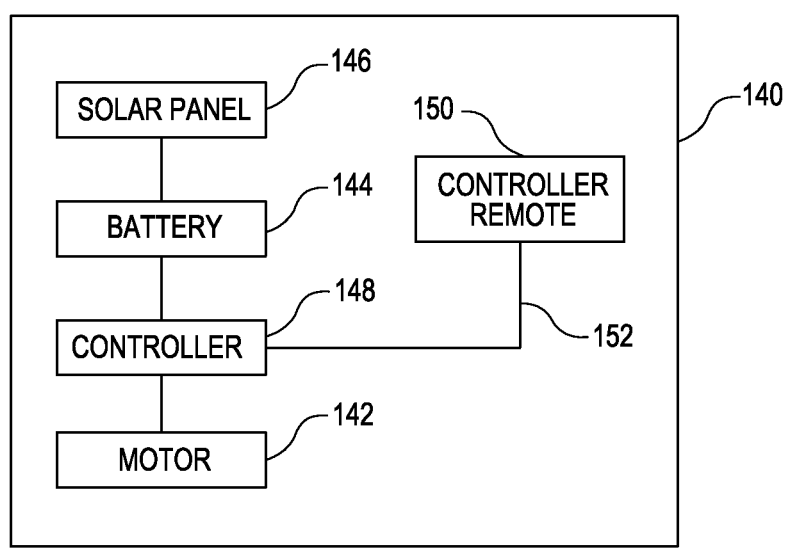
FIG. 7 shows a schematic view a system for powering a personal-sized watercraft, according to an embodiment of the invention.

FIG. 7 shows a schematic view a system 140 for powering a personal-sized watercraft, according to an embodiment of the invention. As discussed elsewhere in this application, in this and other embodiments, the system 140 includes a motor 142 powered by a battery 144, which may be recharged by a solar panel 146. To allow one to control the motor 142, the system also includes a controller 148. In this and other embodiments, one may use the controller 148 to vary the power output of the motor 142. For example, one may use the controller 148 to activate or deactivate the motor, and/or modify the power output of the motor 142 to increase or decrease the speed at which the motor 142 propels the personal-sized watercraft. The system 140 also includes a remote 150 for accessing and conveying instructions to the controller 148. The remote 150 may be coupled to the controller 148 via a cable 152 or wirelessly. The remote 150 may be worn like a wristwatch, with one pushing one or more buttons positioned on his/her wrist to start, stop, and control the speed of the motor 142. In other embodiments, the remote 148 may be attached to a paddle, with one activating, deactivating or controlling the speed of the motor 142 by pushing one or more buttons positioned on the paddle.

The preceding discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

What is claimed is:

1. A device for holding a motor and a propeller, the device comprising:
    a body operable to hold a motor, that when coupled to a propeller and a power source is operable to rotate the propeller, the body including:
        a fin configured to provide directional control and stability when the device is mounted to a personal watercraft and the personal watercraft is propelled on water,
        a cavity located within the fin and configured to receive the motor such that when the motor is disposed in the cavity the body holds the motor, and
        a conduit that extends between the cavity and an exterior surface of the fin, wherein the conduit:
            includes an entrance at the exterior surface of the fin, and
            is configured to hold a power cable that, when coupled to the motor and the power source, provides power from the power source to the motor,
            the entrance being configured to receive the power cable when the power cable extends into the conduit toward the motor, and located on the exterior surface of the fin such that, when the motor is submerged to propel a personal watercraft, the entrance is also submerged; and
    a mount operable to releasably fasten the body to the personal watercraft.

2. The device of claim 1 wherein the personal watercraft includes an inflatable paddle board.

3. The device of claim 1 wherein the personal water craft includes a kayak.

4. The device of claim 1 wherein the cavity is configured such that the body surrounds the motor.

5. The device of claim 1 wherein the body seals the motor inside the cavity to prevent liquid from contacting the motor when the body and a motor are submerged in the liquid.

6. The device of claim 1 wherein the body includes a ring to protect the propeller.

7. The device of claim 1 wherein the mount includes:
    a tongue that, when inserted into a groove of an adapter of the personal watercraft, restrains the device from moving laterally relative to the adapter, and
    a pin that, when inserted into a slot within the groove of the adapter, restrains the device from moving longitudinally relative to the adapter.

8. The device of claim 7 wherein the mount includes:
    a nut having a threaded hole and configured to be inserted into the slot of the adapter, and
    a bolt having a threaded shank configured to threadingly engage the hole of the nut such that, when the tongue is disposed in the groove, the pin and nut are disposed in the slot, and the bolt's shank threadingly engages the nut, the mount is restrained from pivoting about the mount's pin.

* * * * *